United States Patent [19]

Kasugai et al.

[11] Patent Number: 5,598,872
[45] Date of Patent: Feb. 4, 1997

[54] CHECK VALVE

[75] Inventors: Joji Kasugai; Yoshihiro Nagino; Hiroshi Nishi, all of Aichi, Japan

[73] Assignee: Toyoda Gosei Co., Ltd., Aichi, Japan

[21] Appl. No.: 416,577

[22] Filed: Apr. 4, 1995

[30] Foreign Application Priority Data

Apr. 25, 1994 [JP] Japan .................................. 6-110328

[51] Int. Cl.⁶ .................................................... F16K 15/14
[52] U.S. Cl. ............................................. 137/854; 137/852
[58] Field of Search ..................................... 137/854, 852

[56] References Cited

FOREIGN PATENT DOCUMENTS

| 2025940 | 12/1971 | Germany | 137/854 |
|---|---|---|---|
| 106749 | 8/1979 | Japan | 137/854 |
| 60-184779 | 9/1985 | Japan . | |

*Primary Examiner*—John Rivell
*Attorney, Agent, or Firm*—Cushman Darby & Cushman IP Group of Pillsbury Madison & Sutro LLP

[57] ABSTRACT

A check valve which opens and closes a flow path according to pressure differences includes a valve body having a thin annular portion which is flexible in a direction towards an annular seat of a valve body seal member, to close the flow path when seated on the annular seat. A valve body supporting member allows the thin annular portion to bend thereby defining a space between a periphery of the thin annular portion and the seat. A spring applies its elastic force to the valve body so that the valve body is seated on the seat closing the flow path, and a part of the thin annular portion corresponding to a predetermined range of central angles of the annular seat is bent-off the annular seat earlier than the other portions thereof when a pressure greater than the elastic force of the spring is applied to the valve body. Thus, the valve is prevented from being vibrated slightly and accordingly from producing noise when operated.

5 Claims, 5 Drawing Sheets

5,598,872

CHECK VALVE

BACKGROUND OF THE INVENTION

The present invention relates to check valves for use with vehicle fuel tanks and, more particularly, to check valves having a valve body for mounting in a flow path, formed in a casing body, which opens and closes the flow path according to the difference between pressures applied to both sides of the valve body.

In order to protect a fuel tank from the variations in vapor pressure therein, a check valve of this type is built in a two-way valve which is provided between the fuel tank and a canister (cf. Unexamined Japanese Patent Publication (Kokai) Sho-60-184779/(1985)). The check conventional valve will be described with reference to FIG. 9.

In FIG. 9, reference numeral 200 designates such a conventional two-way valve. The two-way valve 200 has a partition wall 206 which divides the space in a casing body 202 into upper and lower valve chambers 203 and 204. The upper valve chamber 203 incorporates a check valve 210 and is sealingly closed with a cover 212, while the lower valve chamber 204 incorporates a diaphragm valve 220, and it is also sealingly closed with a cover 222.

As the internal pressure of the fuel tank increases, the pressure in a tank-side connection port TP is increased. When the pressure in the tank-side connection port TP becomes a predetermined pressure higher than atmospheric pressure, it is applied to the valve body 224 of the diaphragm valve 220 through a passageway (not shown), so that the valve body 224 is moved away from its seat 228 against the elastic force of a spring 226, to allow the fuel vapor in the fuel tank to move into the canister.

When, on the other hand, the internal pressure of the fuel tank decreases, and the difference between the pressure in the tank-side connection port TP and a canister connection port CP becomes higher than a predetermined value, the valve body 214 of the check valve 210 is moved away from its valve seat 218 against the elastic force of a spring 216 mounted on a spring receiving member 217; that is, the check valve 210 is opened to return the fuel vapor from the canister into the fuel tank. As was described above, the valve body 214 of the check valve 210 is supported through the spring receiving member 217 by the spring 216. Hence, the check valve 210 is opened by the elastic force of the spring and the difference between the pressure in the canister connection port CP and the pressure in the tank-side connection portion TP. The valve body 214 of the check valve 210, as shown in FIG. 9, has a thin portion and a thick portion which are coaxial with each other.

The above-described conventional check valve suffers from the following problem: When the pressure difference is in an ordinary range (for instance, from 200 mm Aq to 300 mm Aq), the valve body 214 is vibrated slightly by resonance, thus producing noise. In addition, the intrinsic oscillation characteristic of the valve body 214 and the above-described slight vibration cause a resonance phenomenon in combination, thus amplifying the noise.

A solution to this problem is known. That is, the diameter of a hose (not shown) connected to the canister connection port CP is increased, or the length of the hose is changed, to shift the range of flow rates with which the resonance takes place. However, increasing the diameter or length of the hose not only increases the manufacturing cost of the valve but also obstructs the miniaturization of the latter.

SUMMARY OF THE INVENTION

Accordingly, an object of the invention is to eliminate the above-described difficulties accompanying a conventional check valve.

More specifically, an object of the invention is to provide a check valve simple in structure which is prevented from producing noise while the flow rate is in a predetermined range.

According to the present invention, a check valve which opens and closes a flow path according to pressure differences comprises a valve body seal member having an annular seat; a valve body including a thin annular portion which is flexible, in a direction towards the annular seat in response to pressure thereon, the valve body closing the flow path when the thin annular portion is seated on the annular seat of the valve body seal member; a valve body supporting member supporting the valve body, and allowing the thin annular portion to bend thereby defining a space between a periphery of the thin annular portion and the annular seat; and a spring applying an elastic force to the valve body so that the valve body is seated on the annular seat closing the flow path, a part of the thin annular portion being bent-off from contact with said annular seat earlier than remaining parts thereof when a pressure greater than the elastic force of the spring is applied to the valve body.

The check valve according to the invention operates as follows: When fluid pressure in the flow path exceeds the elastic force applied to the valve body, the thin annular portion is spaced from the seat to open the flow path. The valve body is supported by the valve body supporting member which allows the thin annular portion to bend to space the periphery of the thin annular portion from the seat. The thin annular portion is flexible and is bent by the fluid pressure in such a manner that its periphery is spaced from the annular seat. In this operation, the part of the thin annular portion corresponding to the predetermined range of central angles of the annular seat is bent off the annular seat earlier than a remaining part thereof, to open the valve. Thus, the valve is prevented from being vibrated slightly, and accordingly, from producing noise when operated.

Further, in the check valve according to the invention, the valve body includes a thick annular portion which is located radially inward with respect to the thin annular portion and is integral with the thin annular portion, in such a manner that the valve body is supported by the valve body supporting member through the thick annular portion, and the thin annular portion is seated on the seat of the valve body seal member. The thin annular portion is bendable along the boundary between the thin and thick annular portions, to define the space, and in the predetermined range of central angles of the annular seat, the distance between the boundary of the thin and thick annular portions and the annular seat is longer than in the remaining ranges thereof.

In the check valve, the thin annular portion is spaced from the annular seat, being bent along the boundary between the thin and thick annular portions, and in the predetermined range of central angles of the annular seat the distance between the boundary and the annular seat is longer than in the remaining ranges thereof. Hence, in the case when the thin annular portion is bent by the fluid pressure, the load moment of bending part of the thin annular portion corresponding to the predetermined range of central angles of the annular seat is greater than that of bending the remaining part thereof. Accordingly, that part of the thin annular portion is bent off the annular seat earlier than the remaining part thereof.

Furthermore, in the check valve according to the invention, the thick annular portion is coaxial with the thin annular portion, and the valve body supporting member supports the valve body through the thick annular portion in such a manner that the thin annular portion of the valve body is eccentric from the annular seat of the valve body seal member.

In the check valve thus designed, the valve body is supported through the thin annular portion by the valve body supporting member in such a manner that the thin annular portion is eccentric from the annular seat of the valve body supporting member, and the thick annular portion located inside the thin annular portion is coaxial with the latter. Hence, in this case, too, in the predetermined range of central angles of the annular seat, the distance between the boundary and the annular seat is longer than in the remaining range thereof. Hence, in the case when the thin annular portion is bent by the fluid pressure, the load moment of bending the part of the thin annular portion corresponding to the predetermined range of central angles of the annular seat is greater than that of bending a remaining part thereof. Accordingly, that part of the thin annular portion is bent off the annular seat earlier than a remaining part.

Moreover, in the check valve according to the invention, the thick annular portion is eccentric from the thin annular portion, and the valve body supporting member supports the valve body through the thick annular portion in such a manner that the thin annular portion of the valve body is coaxial with the annular seat of the valve body seal member.

In the check valve thus designed, the valve body is supported through the thin annular portion by the valve body supporting member in such a manner that the thin annular portion is coaxial with the annular seat. Further, the thick annular portion located inside the thin annular portion is eccentric from the latter. Hence, in this case, too, in the predetermined range of central angles of the annular seat the distance between the boundary and the annular seat is longer than in a remaining ranges. Hence, in the case when the thin annular portion is bent by the fluid pressure, the load moment of bending part of the thin annular portion corresponding to the predetermined range of central angles of the annular seat is greater than that of bending a remaining part thereof. Accordingly, that part of the thin annular portion is bent off the annular seat earlier than other portions thereof.

Furthermore, in the check valve in which the valve body has the thin annular portion only, according to the invention, a part of the thin annular portion corresponding to the predetermined range of central angles of the annular seat is made smaller in thickness than a remaining part.

Hence, the check valve operates as follows: When the thin annular portion is bent by a fluid pressure greater than the elastic force of the spring so that its periphery is spaced from the annular seat, the aforementioned part of the thin annular portion which is further reduced in thickness is bent off the annular seat earlier than a remaining parts.

The nature, utility and principle of the invention will be more clearly understood from the following detailed description and the appended claims when read in conjunction with the accompanying drawings.

DETAILED DESCRIPTION OF THE PREFERRED EMBODIMENTS

Preferred embodiments of the invention will be described with reference to the accompanying drawings.

First Embodiment

Figure 1:
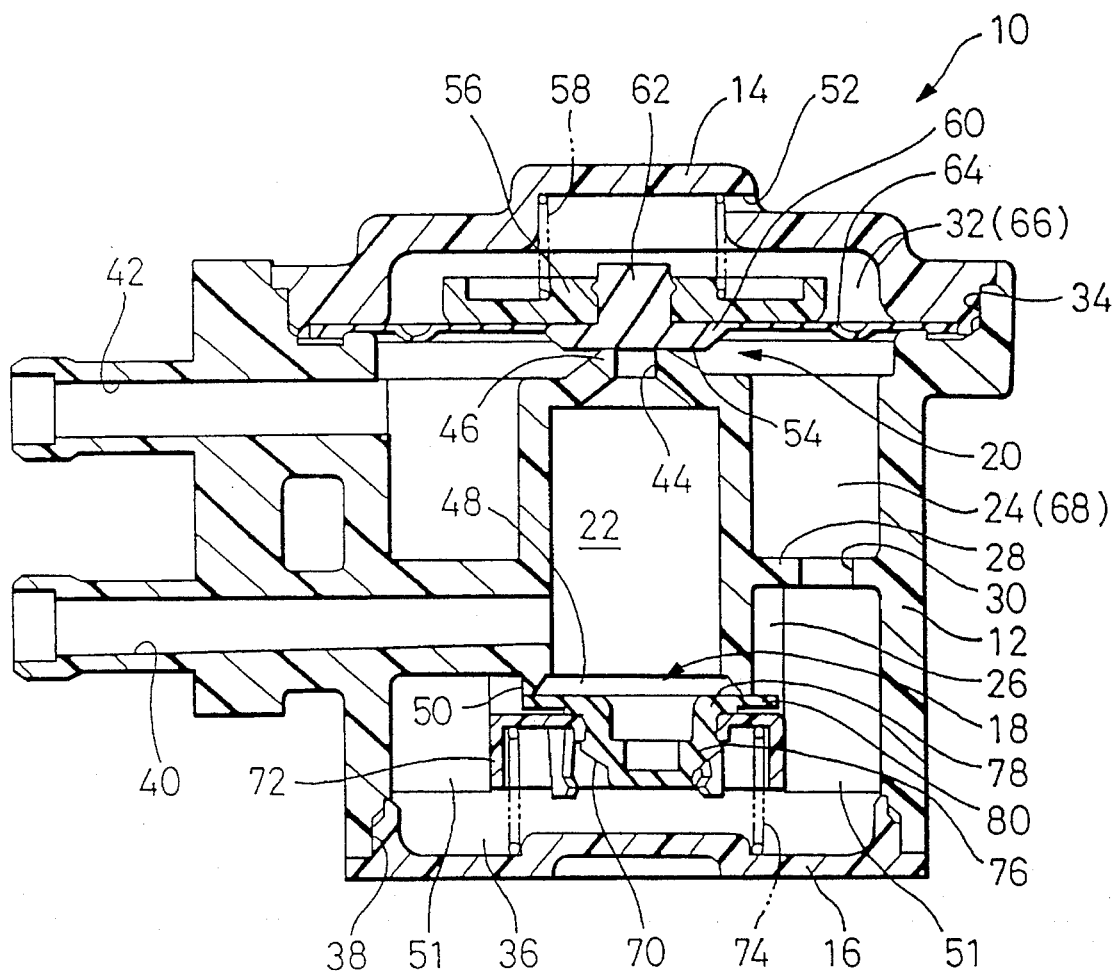
FIG. 1 is a sectional view showing a two-way valve with a check valve which constitutes a first embodiment of the invention.

A two-way valve incorporating a check valve, which constitutes a first embodiment of the invention, is shown in FIG. 1.

The two-way valve, as generally indicated at 10, is adapted to be connected between a fuel tank (not shown) and a canister (not shown). The two-way valve 10 has a substantially cylindrical casing body 12 which is sealingly closed with upper and lower covers 14 and 16, and incorporates the check valve 18 and a diaphragm valve 20. The casing body 12, and the upper and lower covers 14 and 16 are formed by injection-molding thermo-plastic resin such as polyacetal or Nylon.

The casing body 12 has a central flow-path chamber 22 at the center thereof, and a partition wall 28 which divides the space around the central flow-path chamber 22 into an upper space 24 and a lower space 26. The partition wall 28 has a communication hole 30 through which the upper and lower spaces 24 and 26 are communicated with each other. The upper end portion of the upper space 24 is formed into an upper opening 32 larger than the body of the upper space 24, which is surrounded by an upper step 34. Similarly, the lower end portion of the lower space 26 is formed into a lower opening 36 which is slightly larger than the body of the lower space 26, and surrounded by a lower step 38.

The casing body 12 has a thick wall on the left side as viewed in FIG. 1 in which two pipe lines are formed. The lower pipe line is a canister connection pipe line 40 which is adapted to be connected to the canister (not shown), and the upper pipe line is a tank connection pipe line 42 which is adapted to be connected to the fuel tank (not shown). The canister connection pipe line 40 is communicated with the central flow-path chamber 22, and the tank connection pipe line 42 is communicated with the upper space 24. The outer end portions of the canister connection pipe line 40 and the tank connection pipe line 42 are formed into nipples which are connected through hoses (not shown) to the canister and the fuel tank, respectively.

The upper wall of the central flow-path chamber 22 has an upper communication hole 44 whose periphery is formed into a diaphragm valve seal lip 46, on which a diaphragm valve body 54 is seated. The diaphragm valve seal lip 46 is annular. The central flow-path chamber 22 has a lower opening 48 whose periphery is formed into a check valve seal lip 50, on which a check valve body 70 (described later) is seated. The seal lip 50 is also annular. Hence, when the casing body 12 is sealingly closed with the upper cover 14 and the lower cover 16, then in the casing body 12 first and second flow paths are formed between the canister connection pipe line 40 and the tank connection pipe line 42 as follows:

The first flow path consists of the canister connection pipe line 40, the central flow-path chamber 22, the lower opening 48 of the central flow-path chamber 22, the lower space 26, the communication hole 30 in the partition wall 28, the upper space 24 (a diaphragm lower valve chamber 68), and the tank connection pipe line 42 in the stated order. The second flow path consists of the canister connection pipe line 40, the central flow chamber 22, the upper communication hole 44 of the central flow chamber 22, the upper space 24 (the diaphragm lower valve chamber 68), and the tank connection pipe line 42 in the stated order.

In the lower space 26 of the casing body 12, a plurality of guide pieces 51 protrude from the inner surface of the casing body 12 at equal intervals. The guide pieces 51 align a spring guide member 72 (described later) of the check valve 18 with the check valve sealing lip 50, and prevents the spring guide member 72 from being vibrated during vertical movement.

The upper cover 14, which sealingly closes the casing body 12, has an air hole 52 in its side wall which communicates with outside air. The upper cover 14 is engaged with the upper step 34 defining the upper opening 32 of the casing body 12, in such a manner that the diaphragm valve body 54 of the diaphragm valve 20 is held between the periphery of the upper cover 14 and the upper step 34. Under this condition, the upper cover 14 is sealingly connected to the upper step 34 of the casing body 12 by ultrasonic welding. Before the ultrasonic welding operation, the diaphragm valve 20 is set between the upper cover 14 and the casing body as follows:

The diaphragm valve 20 comprises: the diaphragm valve body 54 formed preferably by molding nitrile rubber (NBR), fluororubber (FKM) or the like; a diaphragm spring guide member 56 holding the diaphragm valve body 54; and a diaphragm spring 58. The diaphragm body 54 comprises: a flat-plate-shaped seat 60; a mounting protrusion extended from the seat 60, on which the diaphragm spring guide member 56 is mounted; and a pressure receiving portion 64 extended radially outwardly from the seat 60. After the diaphragm spring guide member 56 is fixedly mounted on the mounting protrusion 62 of the diagram valve body 54, the latter 54 is fitted in the upper step 34 of the casing body 12, and the diaphragm spring 58 is mounted on the central protrusion of the diaphragm spring guide member 56. Thus, the diaphragm valve 20 has been set in the casing body 12. Under this condition, the upper cover 14 is welded to the upper step 34 of the casing body 12 as was described above. The diaphragm spring guide member 56 is formed by injection-molding thermoplastic resin such as polyacetal and Nylon similarly as in the case of the casing body 12.

When the diaphragm valve 20 has been built in the casing body 12 and the upper lid 14 has been welded to the latter 12 in the above-described manner, then the diaphragm valve 20 divides the upper opening 32 as a diaphragm upper valve chamber 66 which is defined by the diaphragm valve body 54 and the upper cover 14, and the upper space 24 as the aforementioned diaphragm lower valve chamber 68. Thus, in the diaphragm valve 20, atmospheric pressure is applied through the air hole 52 to the upper surface of the diaphragm valve body 54 at all times, and the diaphragm spring 58 urges the diaphragm valve body 54 downwardly, so that the seat 60 is seated on the diaphragm valve seal lip 46. On the other hand, fuel vapor flows from the fuel tank into the upper space 24 through the tank connection pipe line 42, so that, in the diaphragm valve 20, the internal pressure of the fuel tank remains applied to the lower surface of the diaphragm valve body 54.

Hence, the diaphragm valve 20 is moved vertically by the difference between the pressures applied to both sides of the diaphragm valve body 54, to open or close the upper communication hole 44 thereby communications the central flow-path chamber 22 with the upper space 24 or interrupting the communication; that is, to open or close the above-described second flow path. Normally, the sum of the atmospheric pressure and the elastic force of the diaphragm spring 58 is greater than the internal pressure of the fuel tank, and therefore the seat 60 of the diaphragm body 54 is seated on the diaphragm valve seal lip 46, so that the second flow path between the canister connection pipe line 40 and the tank connection pipe line 42 is normally closed.

Figure 2:
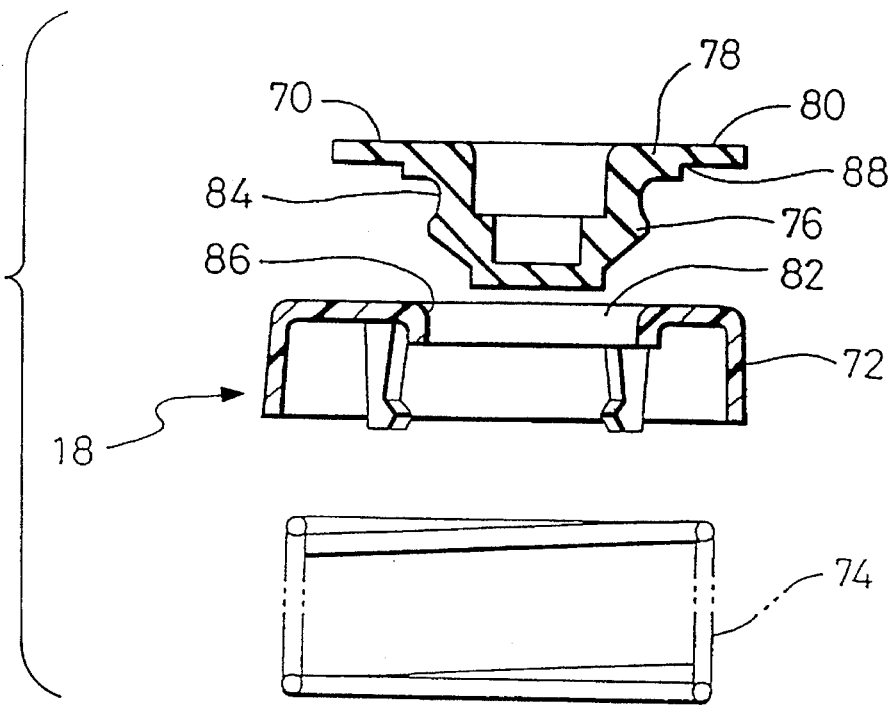
FIG. 2 is an enlarged exploded view showing components of the check valve shown in FIG. 1.
Figure 3:
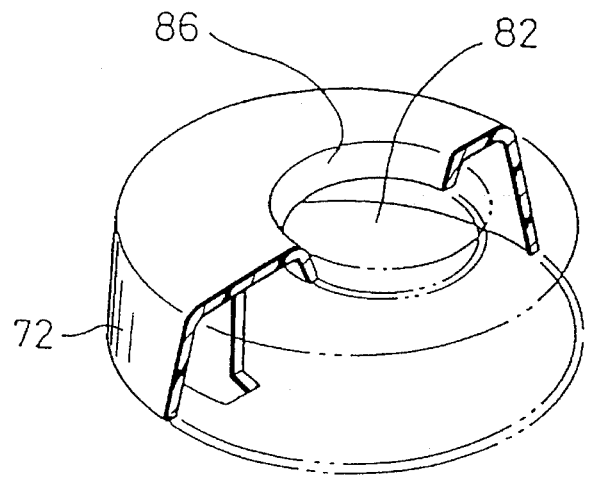
FIG. 3 is a partial perspective view, with parts in section showing a spring guide member which is one of the components of the check valve of the invention.

On the other hand, the lower cover 16 is fitted in the lower step 38 defining the lower opening 36 of the casing body 12, and it is sealingly welded to the lower step 38 by ultrasonic welding. Before this welding operation, the check valve is set between the lower cover 16 and the casing body 12 as follows:

Similar to the above-described diaphragm valve body 54, the check valve 18 comprises: a check valve body 70 formed preferably by molding nitrile rubber (NBR), fluororubber (FKM) or the like; a spring guide member or supporting member 72 holding the check valve body 70; and a spring 74. As shown in FIG. 2, the central portion of the check valve body 70 is formed into a bottomed central protrusion 76, and a thick annular portion 78 is extended radially outwardly from the bottomed central portion 76, and a thin annular portion 80 is extended radially outward from the thick annular portion 78. Thus, the bottomed central protrusion 76, the thick annular portion 78, and the thin annular portion 80 are coaxial with one another. The spring guide member 72 has a valve body insertion hole 82 into which the central protrusion 76 of the check valve body is inserted. The inner periphery of the spring guide member 72, which defines the valve body insertion hole 82, is formed into an engaging wall 86 which is engaged with an engaging recess 84 formed in the base of the central protrusion 76. The valve body insertion hole 82 of the spring guide member 72, as shown in FIGS. 2 and 3, is not coaxial with the spring guide member 72.

Hence, when the spring guide member 72 is fixedly mounted on the central protrusion 76 of the check valve body 70 with the engaging wall 86 engaged with the engaging recess 84 of the check valve body 86, the thick annular portion 78 and the thin annular portion 80 of the check valve body 70 are not coaxial with the spring guide member 72. On the other hand, the check valve body 70 is supported by the spring guide member 72 with the thick annular portion 78 in close contact with the upper surface of the spring guide member 72. The thin annular portion 80 of the check valve body 70 thus supported is spaced from the upper surface of the spring guide member 71. Hence, the outer periphery of the thin annular portion 80 is flexible in a direction towards the upper surface of the spring guide member 72 along the boundary 88 (FIG. 2) between the thick annular portion 78 and the thin annular portion 80.

The check valve body 70, supported by the spring guide member 72, is inserted into the lower space 26 with the spring guide member 72 being guided by the guide pieces 51, as shown in FIG. 1. Next, the spring 74 is set on the lower surface of the spring guide member 72. Thus, the check valve 18 has been set in the casing body 12. Under this condition, the lower cover 16 is welded to the lower step of the casing body 12 in the above-described manner. Before the welding operation, the check valve spring 74 is mounted on the central protrusion of the lower cover 16. The spring guide member 72 is formed by injection-molding thermoplastic resin such as polyacetal and Nylon.

The check valve body 70 is fixedly secured to the spring guide member 71 in such a manner that the former 70 is not coaxial with the latter 71 as was described above, and the spring guide member 71 is aligned with the check valve seal lip 50. Hence, when the check valve 18 has been built in the casing body 12 and the lower cover 16 has been welded to the latter 12, the thick annular portion 78 and the thin annular portion 80, and the boundary 88 between those portions 78 and 80 are not coaxial with the check valve seal portion 50. Under this condition, the thin annular portion 80 is confronted with the check valve seal lip 50, and the check valve 18 is in the above-described first flow path.

In the check valve 18, the internal pressure of the fuel tank is applied through the tank connection pipe line 42 and the first flow path to the lower surface of the check valve body 70 while the elastic force of the spring 74 is also applied to the lower surface of the check valve body 70, so that the thin annular portion of the check valve body 70 is seated on the check valve seal lip 50. On the other hand, the pressure on the canister side is applied through the canister connection pipe line 40 and the first flow path to the upper surface of the check valve body 70.

Hence, the check valve 80 is moved vertically by the difference between the pressures applied to both sides of the check valve body 70, to open or close the lower opening 48 thereby to communicate the central flow-path chamber 22 with the lower space 26 or to interrupt the communication; that is, to open or close the first flow path. Normally, the internal pressure of the fuel tank is equal to the pressure on the canister side, and therefore the thin annular portion 80 of the check valve body 70 is seated on the check valve seal lip 50; that is, the first flow path is normally closed.

Figure 4:
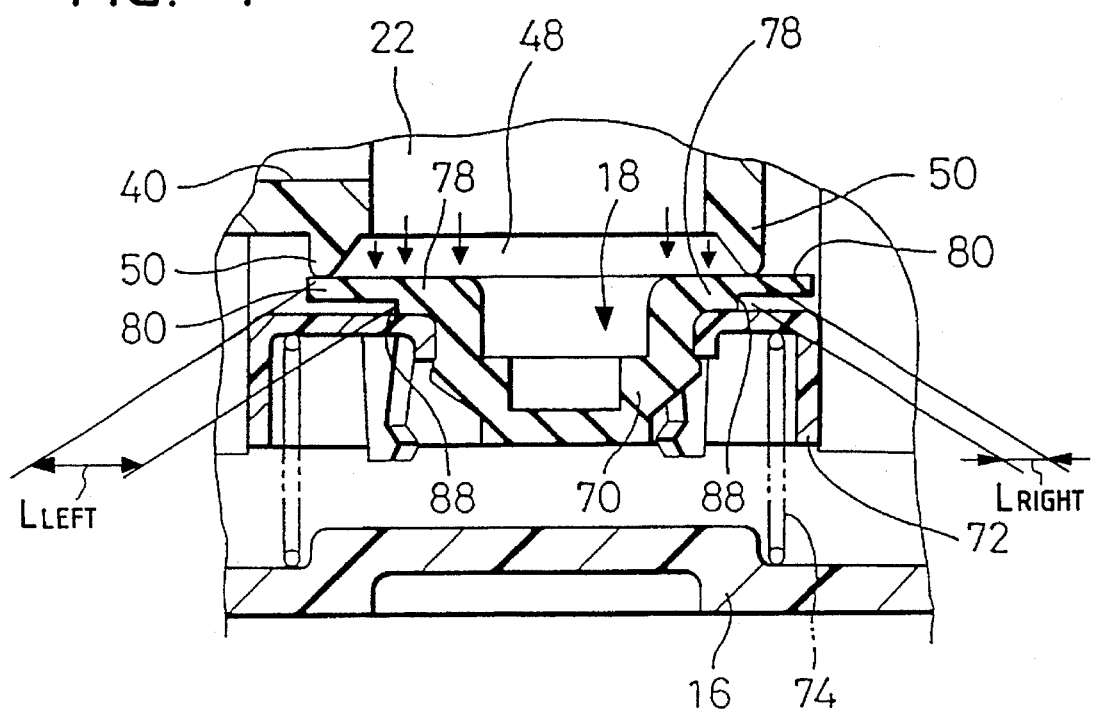
FIG. 4 is an enlarged perspective view showing essential components of the check valve which has been opened.

As was described above, in the check valve 18, the thick annular portion 78 and the thin annular portion 80 of the check valve body 70, and the boundary 88 between those portions 78 and 80 are not coaxial with the check valve seal lip 50. Hence, as shown in FIG. 4, the distance $L_{LEFT}$ between the boundary 88 and the left end of the check valve seal lip 50 differs from the distance $L_{RIGHT}$ between the boundary 88 and the right end of the check valve seal lip depending on the degree of eccentricity; in other words, the left distance $L_{LEFT}$ is larger than the right distance $L_{RIGHT}$ as viewed in FIG. 4. Therefore, the upper surface of the thin annular portion 80 is subjected to the pressure of the central flow-path chamber 22 on the left side more than on the right side thereof. Accordingly, the load moment of bending the thin annular portion 80 along the boundary 88 is greater with a predetermined part (on the left side in FIG. 4) of the check valve seal lip 50 than with the remaining part thereof (on the right side in FIG. 4).

Now, operation of opening and closing the two-way valve 10 will be described.

It is assumed that the internal pressure of the fuel tank becomes higher than atmospheric pressure. The internal pressure is applied to the diaphragm lower valve chamber 68 through the tank connection pipe line 42; that is, the pressure in the diaphragm lower valve chamber 68 is increased. As a result, the diaphragm valve body 54 is pushed upwardly against both the elastic force of the diaphragm spring 58 and atmospheric pressure; that is, the valve is opened until the pressures on both sides of the diaphragm valve body are balanced with each other. As a result, the fuel vapor pressured in the fuel tank is caused to flow to the canister through the tank connection pipe line 42, the diaphragm lower valve chamber 68, the upper communication hole 44 of the central flow-path chamber 22, the central flow-path chamber 22 and the canister connection pipe line 40 in the second flow path in the stated order. Hence, when the internal pressure of the fuel tank becomes greater by a predetermined value than atmospheric pressure; that is, when the difference between those two pressures reaches a predetermined value, the diaphragm valve 20 is opened, so that the fuel vapor in the fuel tank is introduced into the canister.

When, on the other hand, the internal pressure of the fuel tank decreases until the pressure in the canister becomes higher by a predetermined value than that in the fuel tank, the pressure in the canister is applied through the canister connection pipe line 40 to the central flow-path chamber 22, to increase the pressure in the latter 22. As a result, the pressure applied to the upper surface of the check valve body 70 is greater than the sum of the elastic force of the check valve spring 74 and the pressure in the lower space 26. Accordingly, the check valve body 70 pushes the check valve spring 74 downwardly, so that the valve is opened until the pressures on both sides balance each other. Therefore, the fuel vapor in the canister is caused to flow towards the fuel tank through the canister connection pipe line 40, the central flow-path chamber 22, the lower opening 48 of the central flow-path chamber 22, the lower space 26, the communication hole 30 of the partition wall 28, the upper space 24 and the tank connection pipe line 42 in the first flow path in the stated order. In this operation, the diaphragm valve 20 is not opened, because the valve opening pressure of the diaphragm valve body 54 is higher than that of the check valve 18. Hence, when the internal pressure of the fuel tank is decreased by a predetermined value or more, the check valve 18 is opened, so that the fuel vapor in the canister is returned into the fuel tank. Thus, the internal pressure of the fuel tank is maintained in a predetermined range.

A behavior of the check valve 18 in the two-way valve 10 when it is opened, will be described.

Figure 5:
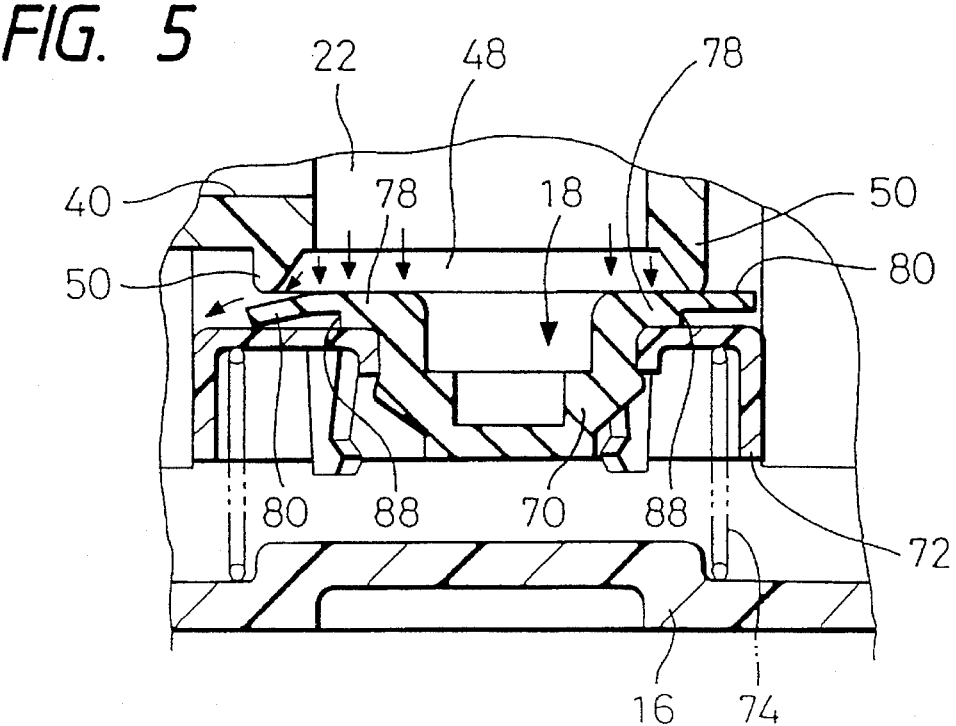
FIG. 5 is an enlarged perspective view showing the essential components of the check valve which has been closed.

As shown in FIG. 4, the load moment of bending the thin annular portion 80 of the check valve 18 along the boundary 88 between the thin annular portion 80 and the thick annular portion 78 is greater on the left side than on the right side. Hence, in the case where the check valve body 70 of the check valve 18 is opened with the internal pressure of the fuel tank being decreased, as shown in FIG. 5 the left part of the thin annular portion 80 which is longer in the distance L between the boundary 88 and the end of the check valve seal lip 50 is bent earlier than the other parts. Thus, the left part of the thin annular portion 80 starts moving from the check valve seal lip 50 defining a space therebetween, and finally the check valve 18 is opened, so that the fuel vapor is returned from the canister into the fuel tank through the check valve thus opened. In other words, the parts of the thin annular portion 80 which are larger in the distance L between the boundary 88 and the end of the check valve seal lip 50 than a predetermined value, function to open the check valve 18. Hence, the valve is prevented from being vibrated slightly when opened or closed, and accordingly from producing noise.

In the embodiment, the check valve 18 is supported by a simple structure; that is, the valve body insertion hole 82 is formed in the spring guide member 72 in such a manner that the former 82 is not coaxial with the latter 72; and the thin annular portion 80 and the thick annular portion 78 which are coaxial with each other, are supported by the spring guide member 72. That is, the embodiment is free from the troublesome operation of adjusting the diameter or length of the hose which is essential with the prior art.

Figure 9:
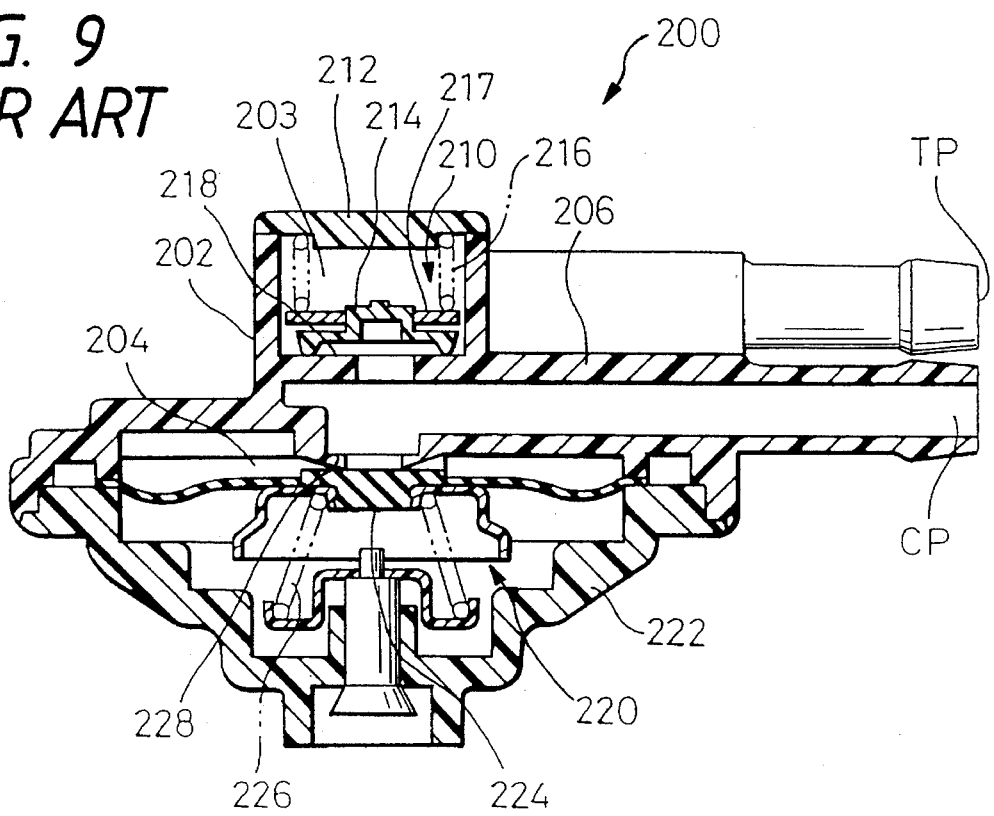
FIG. 9 is a sectional view showing a conventional two-way valve.

Furthermore in the check valve 18, the configuration of the check valve body 70 is not substantially different from that of the conventional one (for instance the valve body 214 of the check valve 210 in FIG. 9) which has the thick annular portion (78) and the thin annular portion (80) coaxially, and the position of the engaging wall 86 of the spring guide member 72 is merely off-centered. Hence, according to the invention, the conventional check valve can be readily modified into one which produces no noise.

Second Embodiment

Another example of the check valve, which constitutes a second embodiment of the invention, will be described.

Figure 6:
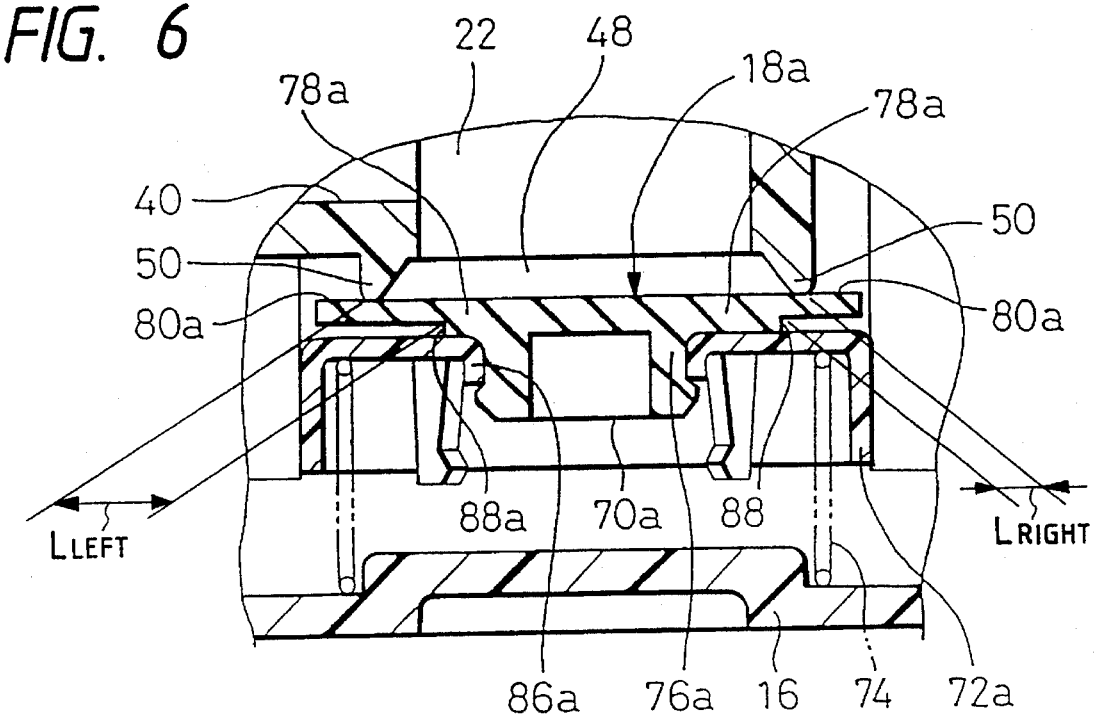
FIG. 6 is an enlarged sectional view showing another example of the check valve which constitutes a second embodiment of the invention.

In the second embodiment, a check valve body forming the check valve, and a spring guide member supporting the check valve body are designed as shown in FIG. 6. That is, in the check valve 18a, its check valve body 70a has a thick annular portion 78a and a thin annular portion 80a extended radially outwardly from the former 78a similarly as in the above-described first embodiment; however, it should be noted that the thick annular portion 78a and the thin annular portion 80a are not coaxial. On the other hand, the spring guide member 62a which is fixedly mounted on the central protrusion 76a of the check valve body 70a, has an engaging wall 86a in the upper surface at the center thereof.

In the check valve 18a thus designed, the thick annular portion 78a and the thin annular portion 80a are not coaxial as was described above. Hence, the boundary 88a between those annular portions 78a and 80a is eccentric from the check valve seal lip 50. Therefore, similarly as in the case of the first embodiment (the check valve 18), the distance $L_{LEFT}$ between the boundary 88a and the left end of the check valve seal lip 50 differs from the distance $L_{RIGHT}$ between the boundary 88a and the right end of the check valve seal lip 50 depending on the degree of eccentricity; in other words, in FIG. 6, the left distance $L_{LEFT}$ is larger than the right distance $L_{RIGHT}$. Therefore, the upper surface of the thin annular portion 80 is subjected to the pressure of the central flow-path chamber 22 on the left side more than on the right side. Accordingly, the load moment of bending the thin annular portion 80a along the boundary 88a is greater with a predetermined part thereof (on the left side in FIG. 4) of the check valve seal lip 50 than with the other part thereof (on the right side in FIG. 4). Accordingly, in FIG. 6 the left part of the thin annular portion 80a is bent earlier than the right part, which prevents the valve from being vibrated slightly when operated and accordingly from producing noise.

In the check valve 18a, the spring guide member 72a is not substantially different in function (such as a check valve supporting function, and an elastic force transmitting function) from the conventional one; and it is formed merely by shifting the centers of the thick annular portion 78a and the thin annular portion 80a from each other. This means that, according to the invention, the conventional check valve can be readily modified into the one which produce no noise when operated.

Third Embodiment

Another example of the check valve, which constitutes a third embodiment of the invention, will be described with reference to FIG. 7.

A check valve body forming the check valve is designed as follows: The spring guide member of the check valve is the same as the one 72a in the above-described second embodiment. That is, as shown in FIG. 7, the check valve body 72b comprises a thick annular portion 78b and a thin annular portion 80b which is extended radially outwardly from the former 78b in such a manner that those annular portions 78b and 80b are coaxial with each other. Further, as viewed in FIG. 7, a predetermined left part of thin annular portion 80b (corresponding to a predetermined central angle (for instance 60°) of the check valve body 70b) is further reduced in thickness.

Figure 7:
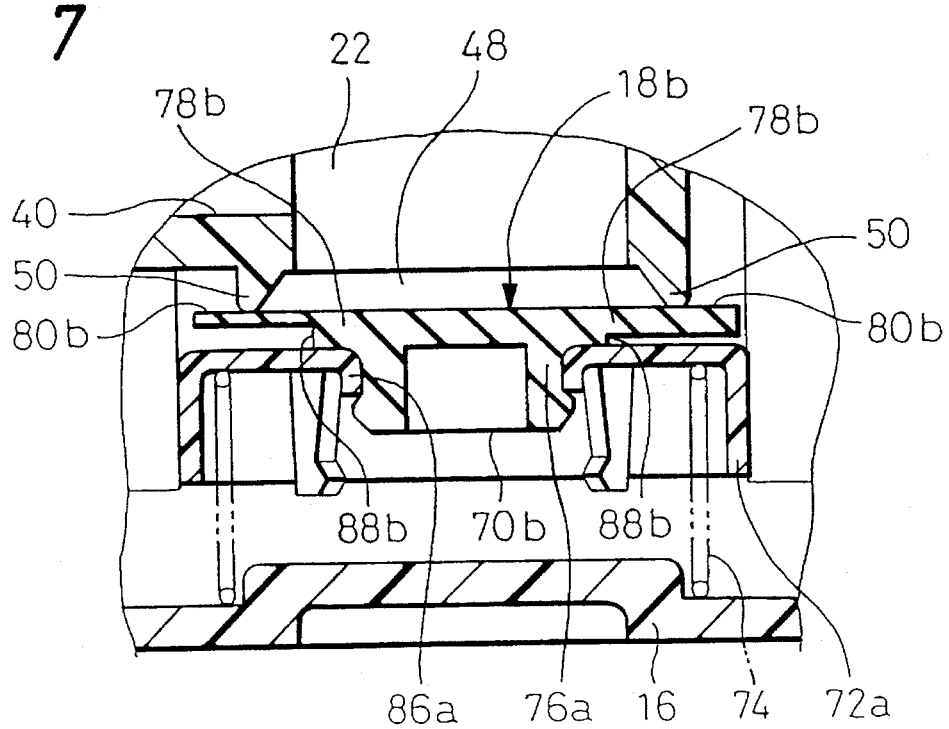
FIG. 7 is an enlarged sectional view showing another example of the check valve which constitutes a third embodiment of the invention.

In the check valve 18b thus designed, as was described above the thick annular portion 78b and the thin annular portion 80b are coaxial with each other, and the predetermined left part of the thin annular portion 80b is further reduced in thickness as viewed in FIG. 7. Hence, with the same load moment, the predetermined left part of the thin annular portion 80b is bent earlier than the other part thereof. This feature prevents the valve from being vibrated slightly when operated and accordingly from producing noise.

The check valve 18b of the invention is different from the conventional one whose check valve body comprises a thick annular portion and a thin annular portion which are coaxial with each other, in that the predetermined part of the thin annular portion is further reduced in thickness. Hence, according to the invention, the conventional check valve can be readily modified into one which produces no noise sounds when operated.

Fourth Embodiment

Figure 8:
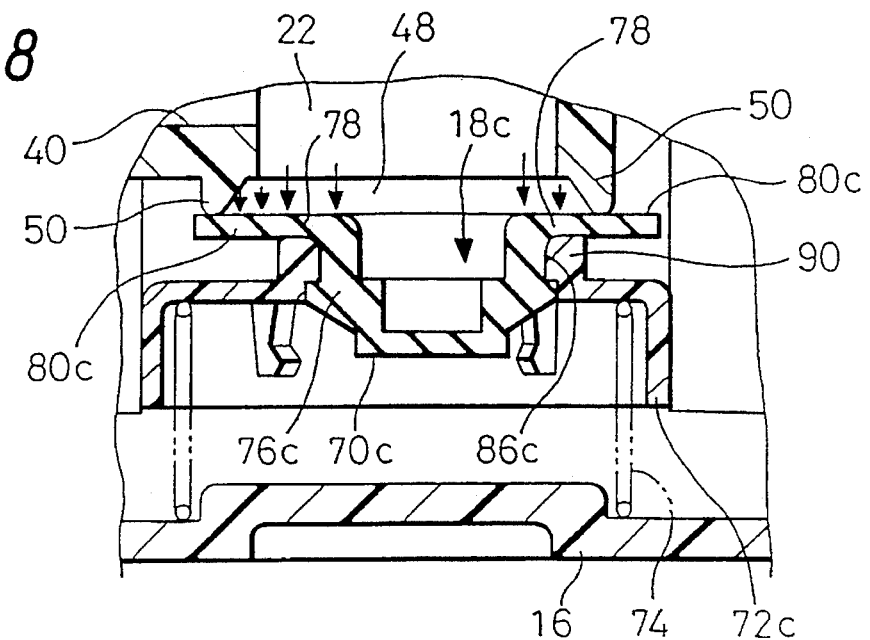
FIG. 8 is an enlarged sectional view showing another example of the check valve which constitutes a fourth embodiment of the invention.

Another example of the check valve, which constitutes a fourth embodiment of the invention, will be described with reference to FIG. 8.

In the fourth embodiment, a check valve body forming the check valve is designed as follows: In the fourth embodiment, unlike the above-described embodiments in which the check valve body comprises the thick annular portion and the thin annular portion, the check valve body has no thick annular portion. That is, in the check valve 18c, the check valve body 70c comprises a central protrusion 76c and a thin annular portion 80c which is radially outwardly extended from the central protrusion 76c. On the other hand, the central protrusion 76c of the check valve body 70c has an engaging wall 86c, and a protruded annular wall 90 is formed on the upper surface of the spring guide member 72c which is fixedly engaged with the engaging wall 86c of the check valve body 70c in such a manner that the protruded annular wall 90 is eccentric from the spring guide member 72c. Hence, when the spring guide member 72 is fixedly engaged with the check valve body 70c, the thin annular portion 80c of the check valve body 70c is flexible along the upper end of the protruded annular wall 90.

In the check valve 18c thus designed, the upper end face of the protruded annular wall 90, with which the lower surface of the thin annular portion 80c of the check valve body 70c is in contact, is eccentric from the check valve seal lip 50. Hence, similar to the above-described check valves 18 and 18a, as viewed in FIG. 7 the distance L between the left edge of the check valve seal lip 50 and the protruded annular wall 90 is different from that between the right edge of the check valve seal lip 50 and the protruded annular wall 90 depending on the degree of eccentricity. Hence, in FIG. 7 the predetermined left part of the thin annular portion is bent earlier than the right part thereof. Hence, the valve is prevented from being vibrated slightly during operation, and accordingly from producing noise.

In the check valve 18c, the check valve body 70c is obtained by forming the protruded annular wall 90 on its upper surface, and it requires no thick wall portion (78c). Hence, according to the invention, the conventional check valve can be readily changed into one which produces no noise.

The invention has been described with reference to the two-way valve 10; however, the invention is not limited thereto or thereby. That is, the technical concept of the invention may be applied to any check valve which is opened when a pressure applied thereto exceeds a predetermined value, such as for instance a fuel valve connected to a fuel tank. Furthermore, in the above-described embodiments, the diaphragm valve 20 for opening and closing the second flow path is operated by atmospheric pressure; however, the invention is not limited thereto or thereby. That is, the diaphragm valve 20 may be so designed that it is operated by a pressure which is employed as a reference pressure. It goes without saying that the technical concept of the invention is equally applied to a one-way valve having no diaphragm valve (20).

As was described above, in the check valve of the invention, the part of the thin annular portion corresponding to the predetermined range of central angles of the annular seat is bent off the latter earlier than the remaining part thereof, to open the valve, which prevents the valve from being vibrated slightly and accordingly from producing noise when operated. This effect is obtained without addition of a special member to the casing body. Thus, the check valve of the invention is relatively simple in structure.

The modifications of the check valves can be obtained by slightly modifying the check valve body and the spring guide member for supporting the check valve body. Hence, according to the invention, a conventional check valve can be readily modified into one which produces no noise when operated.

While there has been described in connection with the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A check valve which opens and closes a flow path therethrough according to pressures differences, the check valve comprising:

a valve body seal member having an annular seat of predetermined area;

a valve body including a thin annular portion which is flexible in a direction towards said annular seat in response to pressure thereon, said valve body closing the flow path when said thin annular portion is seated on said annular seat of said valve body seal member;

a valve body supporting member which supports said valve body, said valve body supporting member being constructed and arranged to allow said thin annular portion to bend thereby defining a space between a periphery of said thin annular portion and said annular seat to open the flow path; and a spring associated with said valve body so as to apply an elastic force to said valve body so that said valve body is seated on said annular seat closing the flow path;

a part of said thin annular portion of said valve body being constructed and arranged to be bent-off from contact with said annular seat earlier than other parts thereof when a pressure greater than the elastic force of said spring is applied to said valve body, wherein said valve body comprises a thick annular portion which is located radially inward with respect to said thin annular portion and is integral with said thin annular portion, said valve body being supported by said valve body supporting member through said thick annular portion, and said thin annular portion being seated on said annular seat of said valve body seal member closing the flow path, and said thin annular portion being bendable along a boundary between said thin annular portion and said thick annular portion so as to define said space, and in said predetermined area of said annular seat, the distance between said boundary of said thin and thick annular portions and said annular seat is longer than in other areas thereof.

2. A check valve as claimed in claim 1, wherein said thick annular portion is coaxial with said thin annular portion, and said valve body supporting member supports said valve body through said thick annular portion in such a manner that said thin annular portion of said valve body is eccentric from said annular seat of said valve body seal member.

3. A check valve as claimed in claim 1, wherein said thick annular portion is eccentric from said thin annular portion, and said valve body supporting member supports said valve body through said thick annular portion in such a manner that said thin annular portion of said valve body is coaxial with said annular seat of said valve body seal member.

4. A check valve as claimed in claim 1, wherein a part of said thin annular portion corresponding to said predetermined area of said annular seat has a thickness less than remaining portions thereof.

5. A check valve which opens and closes a flow path therethrough according to pressures differences, the check valve comprising:

a valve body seal member having an annular seat of predetermined area;

a valve body including a thin annular portion which is flexible in a direction towards said annular seat in response to pressure thereon, said valve body closing the flow path when said thin annular portion is seated on said annular seat of said valve body seal member;

a valve body supporting member which supports said valve body, said valve body supporting member being constructed and arranged to allow said thin annular portion to bend thereby defining a space between a periphery of said thin annular portion and said annular seat to open the flow path; and a spring associated with said valve body so as to apply an elastic force to said valve body so that said valve body is seated on said annular seat closing the flow path;

a part of said thin annular portion of said valve body being constructed and arranged to be bent-off from contact with said annular seat earlier than other parts thereof when a pressure greater than the elastic force of said spring is applied to said valve body, wherein said valve body includes a bottomed central protrusion at a center thereof and a thick annular portion extended radially outwardly from the bottomed central portion, said bottomed central protrusion, the thick annular portion, and the thin annular portion being coaxial with said annular seat of said valve body seal member; and wherein said valve body supporting member has a valve body insertion hole into which the central protrusion of the valve body is disposed, the valve body insertion hole being eccentric from said annular seat of said valve body seal member.

* * * * *